United States Patent [19]

Henry, Jr.

[11] Patent Number: 5,277,319

[45] Date of Patent: * Jan. 11, 1994

[54] PANEL MOUNTING SYSTEM

[75] Inventor: Robert E. Henry, Jr., Princeton, W. Va.

[73] Assignee: Conn-Weld Industries, Inc., Princeton, W. Va.

[*] Notice: The portion of the term of this patent subsequent to May 12, 2009 has been disclaimed.

[21] Appl. No.: 908,426

[22] Filed: Jun. 30, 1992

Related U.S. Application Data

[63] Continuation of Ser. No. 754,763, Sep. 4, 1991, abandoned, which is a continuation of Ser. No. 563,062, Aug. 6, 1990, Pat. No. 5,112,475.

[51] Int. Cl.⁵ .................................................. B07B 1/49
[52] U.S. Cl. .................................. 209/399; 209/403; 209/405
[58] Field of Search ............... 209/397, 399, 405, 403, 209/395, 408, 412, 400, 401, 409; 160/327, 391; 52/762, 772, 460, 461, 464, 468

[56] References Cited

U.S. PATENT DOCUMENTS

| 3,042,206 | 7/1962 | Olender | 209/405 X |
|---|---|---|---|
| 3,665,666 | 5/1972 | Delcroix | 52/461 |
| 4,096,058 | 6/1978 | Borie | 209/408 X |
| 4,141,821 | 2/1979 | Wolff | 209/405 |
| 4,219,412 | 8/1980 | Hassall | 209/399 |
| 4,383,919 | 5/1983 | Schmidt | 209/399 |
| 4,603,528 | 8/1986 | Sigerist | 52/464 |
| 4,661,245 | 4/1987 | Rutherford et al. | 209/399 |
| 4,670,136 | 6/1987 | Schmidt et al. | 209/399 X |
| 4,861,462 | 8/1989 | Lehmann et al. | 209/397 X |
| 4,882,044 | 11/1989 | Freissle | 209/399 X |
| 4,909,929 | 3/1990 | Tabor | 209/400 |
| 4,936,065 | 6/1990 | Hutchinson | 52/461 X |
| 5,112,475 | 5/1992 | Henry et al. | 209/403 X |

FOREIGN PATENT DOCUMENTS

| 567632 | 12/1958 | Canada | 209/403 |
|---|---|---|---|
| 1008257 | 5/1957 | Fed. Rep. of Germany | 209/403 |
| 2749489 | 11/1977 | Fed. Rep. of Germany | 209/399 |
| 2574007 | 6/1986 | France | 209/399 |
| 0752229 | 3/1975 | South Africa | 209/399 |
| 1034793 | 8/1983 | U.S.S.R. | 209/405 |
| 1480894 | 5/1989 | U.S.S.R. | 209/399 |
| 0000341 | 6/1979 | World Int. Prop. O. | 209/399 |

Primary Examiner—D. Glenn Dayoan
Attorney, Agent, or Firm—Jones, Tullar & Cooper

[57] ABSTRACT

System for mounting screen and other panels in vibrating and other screening apparatus in which longitudinal channel members interposed between laterally adjoining panels and anchored to apertured longitudinal supports, have spaced normally upright flexible sides each yieldably flexing inwardly in response to pressing of a panel edge thereagainst for seating the edge in an external groove in the channel side, the channel member containing a longitudinally coterminous cavity opening upwardly through a relatively restricted slot, and the panel edge being releasably lockable in the channel groove by a T-shaped lock member having a stem insertible in said cavity through said slot for forcing the flexed side to return to upright edge-locking position. The system also includes clamps on sides of the apparatus for clamping contiguous outer sdges of screen panels thereto, reinforcing of profile wire screens by socketing projected ends of their tie rods in molded screen edges, and for vibrating screening apparatus, dams mounted at predetermined longitudinal intervals for retarding flow through the apparatus.

5 Claims, 5 Drawing Sheets

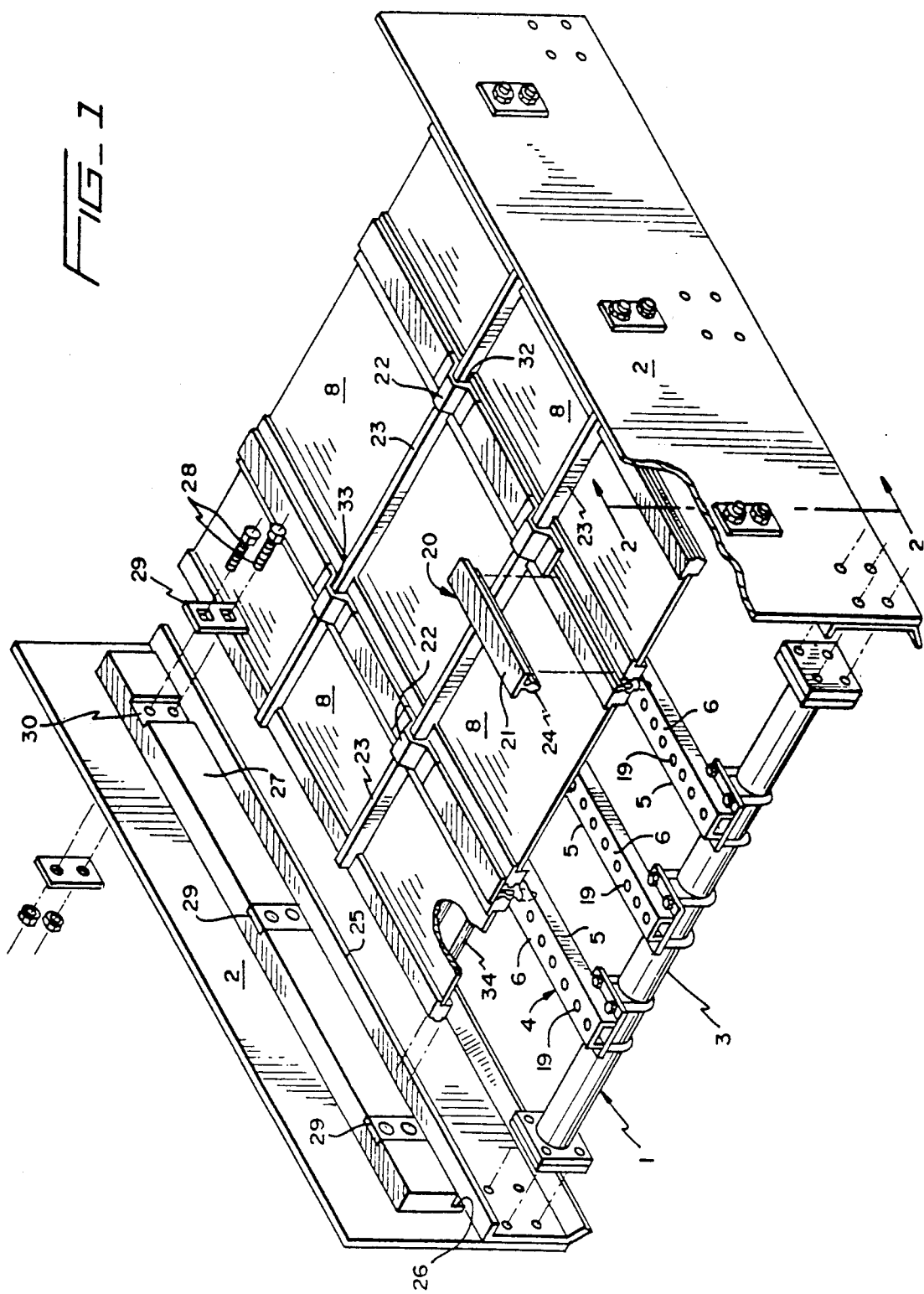
FIG_1

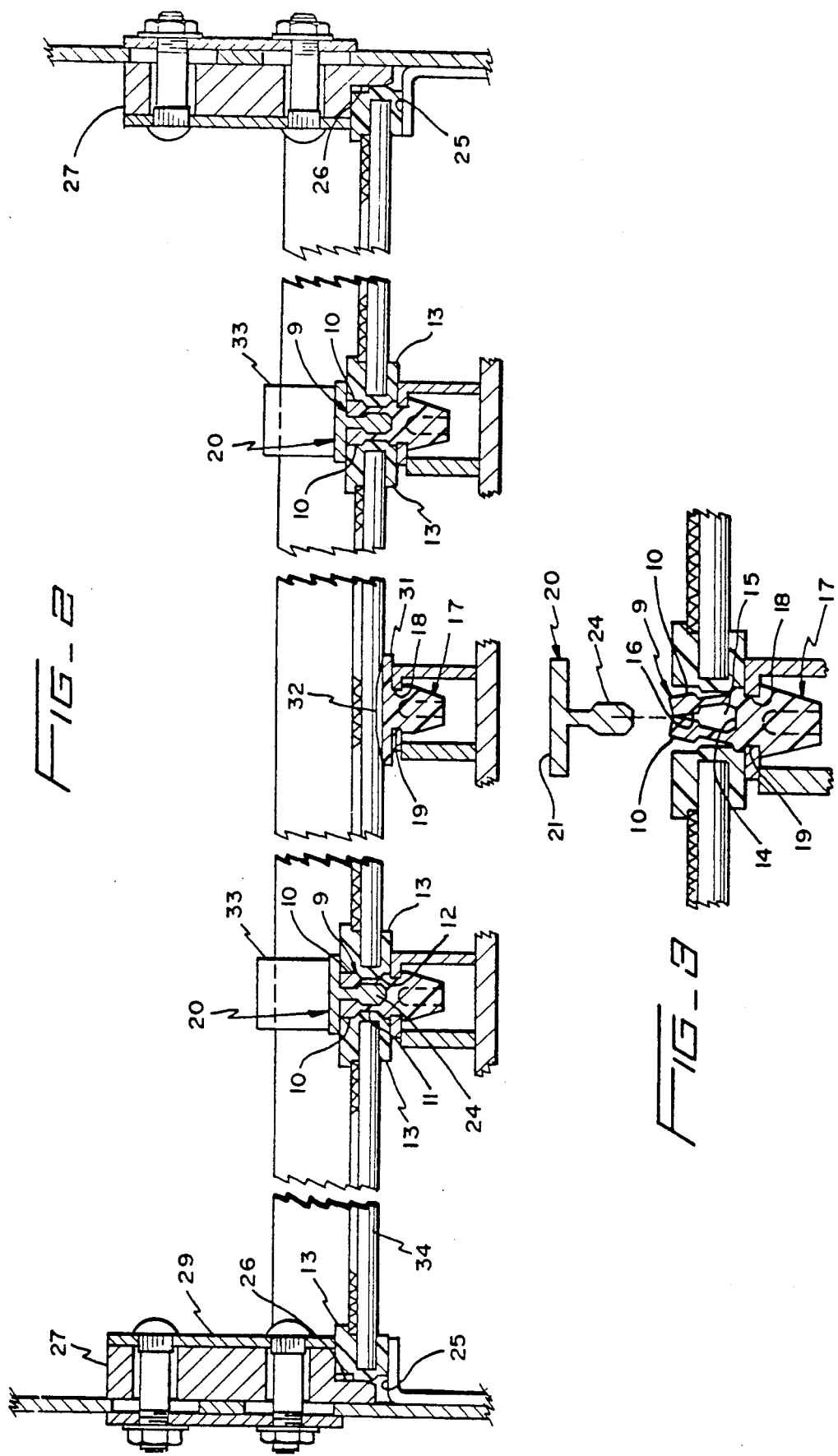

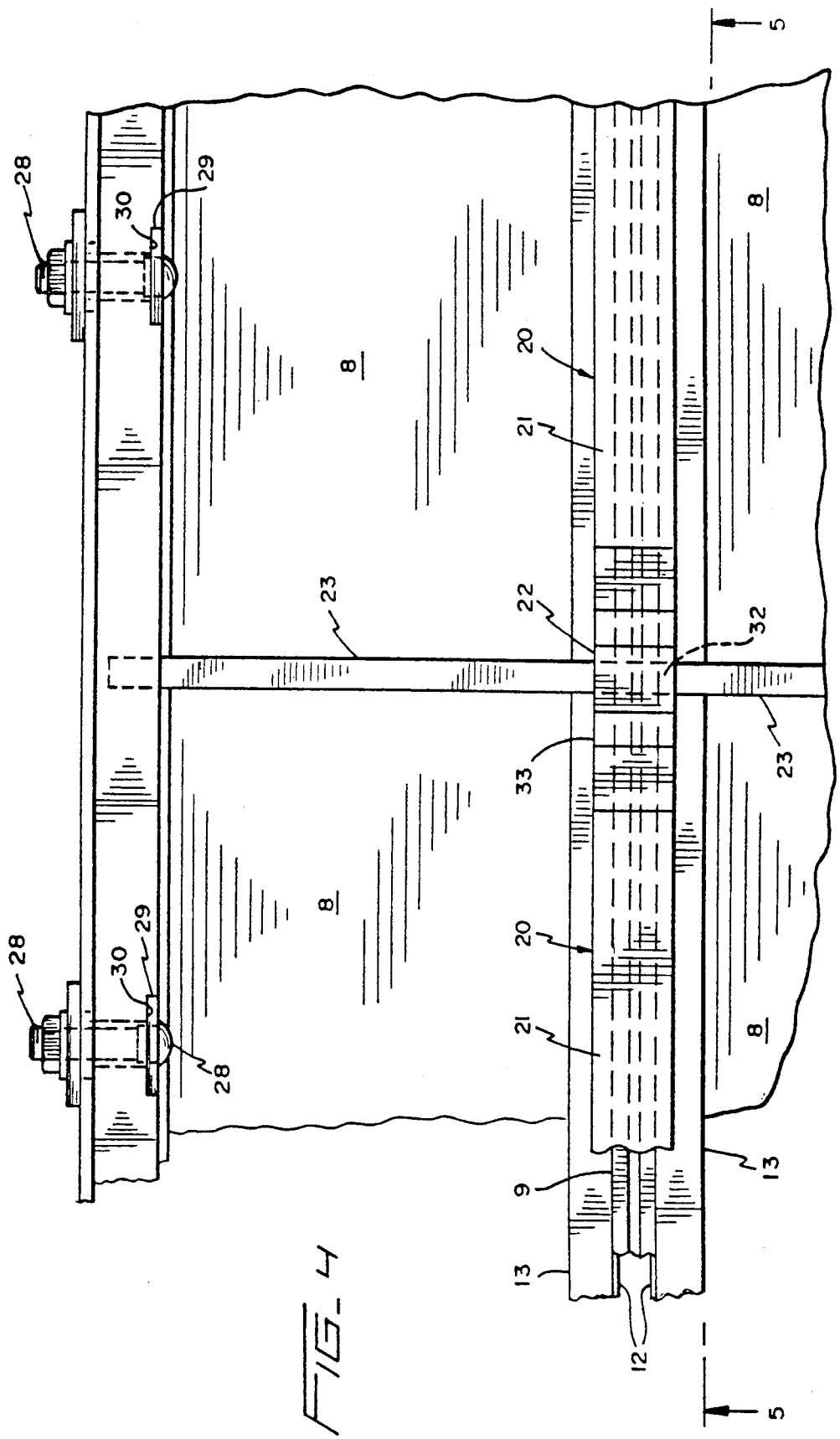

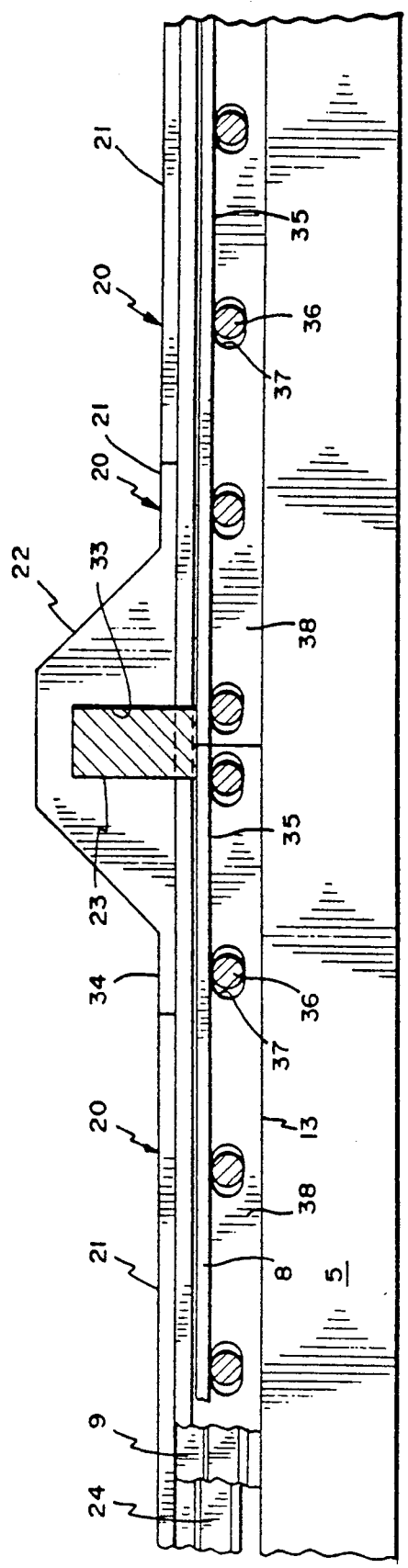

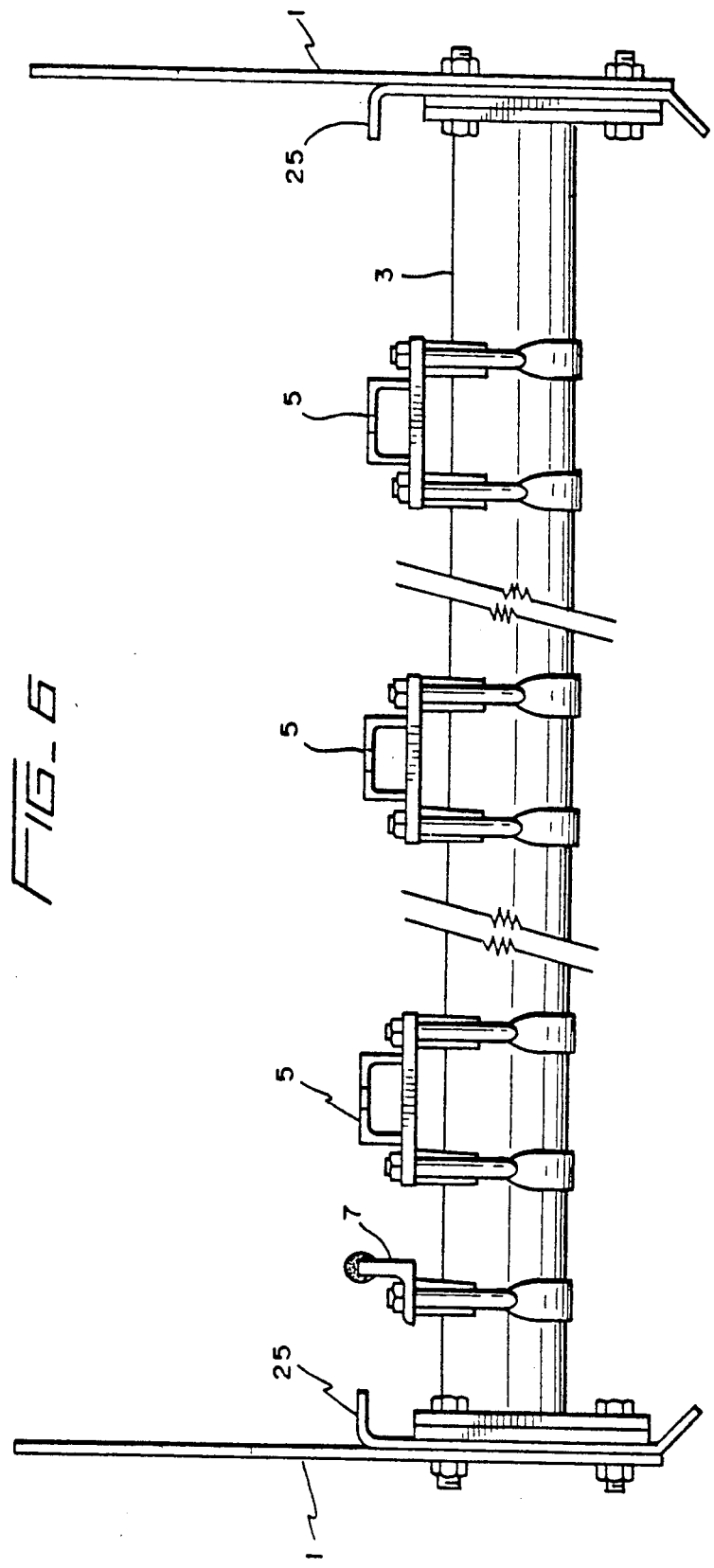

PANEL MOUNTING SYSTEM

CROSS-REFERENCE TO RELATED APPLICATION

This application is a continuation of application Ser. No. 754,763, filed Sep. 4, 1991, now abandoned which is a continuation of application Ser. No. 563,062, filed Aug. 6, 1990 and now U.S. Pat. No. 5,112,475.

BACKGROUND OF THE INVENTION

Mounting of panels in screening apparatus can present problems both in initial installation and in removal and replacement of worn panels and these problems become particularly acute when the apparatus is vibrating screening apparatus. Such apparatus customarily has a grid or frame bounded at sides by side plates and for each of one or more decks or levels either laterally spaced longitudinal or intersecting longitudinal and transverse support members.

To be both installable and removable, the screen panels in vibrating screening apparatus must be removably fastened to the support members. The present practice in fastening systems for vibrating apparatus is to fasten the panels directly to the support members by fasteners inserted in the panels and received in apertures or holes in the support members. The fasteners used or proposed for such systems are of several types. In one type, disclosed in the U.S. Pat. No. to Freissle, 3,980,555, the fasteners are half-round frusto-conical plastic plugs or protrusions integral and flush with and depending from sides of a molded polyurethane screen panel, each insertible with a half plug of an adjoining panel in an aligned aperture in a support member.

In the systems disclosed in the U.S. Pat. No. to Wolff, 4,141,821, the screen panels, molded or cast suitably of polyurethane, have integral hollow tubular sleeves or protrusions seatable in apertures in support members and expandable into clamping contact with the apertures by individual metal or plastic pins inserted through the protrusions. In the modification of FIG. 8, Wolff replaces the separate pins of his preferred embodiment by a plurality of necked frusto-conical pins molded to a rib separate from a screen panel and insertible together through tubular protrusions in a panel. Another present fastening system dispenses with integral tubular sleeves or protrusions on the screen panels and uses for fastening a suitably polyurethane securing pin having a head seatable in an opening in a panel and a neck restricted to fit an aperture in a support member.

The present invention is an improvement on prior systems for mounting screen panels in vibrating and other screening apparatus.

SUMMARY OF THE INVENTION

The primary object of the present invention is to provide an improved system for mounting screen and other panels in vibrating and other screening apparatus, the system having a normally upright flexible-sided member anchored to a frame of said apparatus and having in a side a seat adapted to receive and seat an edge of a screen panel on flexing away therefrom, and lock means engageable with said side for releasably locking said panel edge in said seat by returning said flexed side to upright position.

Another object of the invention is to provide an improved system for mounting screen and other panels on frames of vibrating and other screening apparatus, wherein a longitudinally extending channel member having normally upright flexible sides is interposed between laterally adjoining panels and anchored to a frame support member and has in opposite sides external grooves each adapted on inward flexing to receive and seat an edge of an adjoining panel, and a lock member having an elastomeric stem releasably insertible through a restricted slot into and expandable in an upwardly opening longitudinally coextensive cavity in said channel member for releasably locking said panel edge in said channel groove by returning said flexed side to upright position.

An additional object of the invention is to provide an improved system for mounting screen and other panels in vibrating and other screening apparatus, wherein, intead of themselves being anchored to a frame of the apparatus, the panels are releasably locked to fastening means that are anchored to the frame.

A further object of the invention is to provide a system for mounting screen and other panels in vibrating and other screening apparatus having a frame contained between laterally spaced longitudinally extending side plates, wherein contiguous inner edges of laterally adjoining panels are releasably lockable in external grooves in opposite sides of a longitudinally extending flexible-sided channel member anchored in longitudinally spaced apertures in a support member of the frame, and non-contiguous outer edges of panels are supported on and releasably clamped to the side plates.

Another object of the invention is to provide for a panel mounting system of the character described in the immediately preceding object, a longitudinally extending elastomeric channel member having spaced normally upright flexible sides and in opposite sides external grooves each adapted on inward flexing to receive and seat a laterally outstanding rib on an edge of an adjoining panel, plastic key means removably insertible through a restricted slot into an upwardly opening longitudinally extending cavity in the channel member for returning a flexed side to upright edge-locking position.

A panel mounting system according to the immediately preceding object, wherein the channel member has depending therefrom longitudinally spaced protrusions fittable in correspondingly spaced apertures in a support member of the frame for releasably anchoring said channel member thereto.

A system for mounting panels in vibrating screening apparatus, including for mounting dams at predetermined longitudinal intervals, an elastomeric retainer having a transverse sleeve containing a through bore of generally rectangular cross-section for receiving inner ends of adjoining dams, key means depending from the sleeve and insertible through a restricted slot into a longitudinally extending cavity in an elastomeric flexible-sided channel member for releasably seating said inner ends, and means on sides of said apparatus for supporting and releasably receiving outer ends of said dams.

Yet another object of the invention is to provide a system for mounting panels in vibrating screening apparatus, whereof panels having elastomeric edges interfittable in adjoining sides of a flexible-sided fastener member, are releasably lockable in said sides by key means removably insertably in said fastener member, and are supported between opposite edges by means extending at ends into said edges.

FIGURE DESCRIPTION

FIG. 1 is a partial semi-exploded isometric view of a frame of a vibrating screening apparatus incorporating a preferred embodiment of the panel mounting system of the present invention;

FIG. 2 is a fragmentary horizontal sectional view on an enlarged scale taken along lines 2—2 of FIG. 1;

FIG. 3 is a fragmentary horizontal sectional view on a further enlarged scale showing a fastener of FIG. 2 with a locking member removed and the sides inwardly flexed for alternately receiving and releasing sides of laterally adjoining panels;

FIG. 4 is a fragmentary plan view on the scale of FIG. 2 showing parts of longitudinally adjoining panels on a side of the frame and an interposed dam locked in operative position to both the frame's side plate and an adjacent fastener;

FIG. 5 is a fragmentary vertical sectional view taken along lines 5—5 of FIG. 4; and FIG. 6 is a front elevational view on the scale of FIGS. 2 and 4 showing the connections to a crosstube of the illustrated frame of fittings suitable for supporting the improved mounting system applied to vibrating screening apparatus.

DETAILED DESCRIPTION

Rreferring now in detail to the drawings in which like reference characters designate like parts, the improved mounting system of the present invention, while adaptable for use in other screening apparatus, is particularly designed for mounting screen and other panels in vibrating screening apparatus and will be so described as exemplary of the invention.

As pointed out in the "BACKGROUND" of Conn-Weld's Connolly et al U.S. Pat. No. 4,840,723, vibrating screening apparatus customarily has a frame formed of transversely spaced side frames or plates connected by cross-members and has between the side frames one or a plurality of vertically spaced decks or beds for mounting screen or other panels. While suitable for mounting panels in vibrating screening apparatus of various types, the panel mounting system of the present invention has been illustrated applied to the apparatus of the above Connolly patent.

To the extent typical of vibrating screening apparatus, the Connolly apparatus is comprised of a frame I formed of parallel longitudinally extending transversely spaced side plates 2 connected by laterally spaced cross-members 3, the latter, suitably in the form of crosstubes, supporting a screen or other panel deck or bed 4. As in the Connolly apparatus, the panel deck 4 customarily includes a plurality of laterally spaced longitudinally extending anchor members 5, each presenting as a web of an inverted channel or upper leg of an angle iron , an incrementally apertured horizontal surface 6. In conventional vibrating screening apparatus the anchor members 5 are welded to the frame 1, while in the Connolly apparatus they conveniently are channel parts of weldments U-bolt-and-saddle bolted to the cross-tubes 3. The use instead of welding of a bolted attachment in the Connolly apparatus also extends to any rubber-capped angle iron bucker bars 7 used to support panels 8 intermediate their sides.

Designed for enabling screen and other panels 8 to be readily mounted in and as readily removed from vibrating screening apparatus, the panel mounting system of the present invention is comprised of elastomeric, preferably polyurethane, flexible-sided, longitudinal or longitudinally extending channel members or U-shaped fasteners, holders or hold-downs 9. Anchored to underlying incrementally apertured anchor members 5, the channel members or U-shaped fasteners 9 are each interposed between laterally adjoining panels 8 and have in opposite sides or wings 10 longitudinally extending external grooves or seats 11 for receiving and seating correspondingly contoured, interfitting or mating sides of edges 12 of confronting edge members or borders 13 of adjacent panels. Whether the particular panels 8 are nonporous or solid molded plastic or screen panels with profile or woven wire or molded plastic screening, the borders 13, as are the interposed fasteners 9, suitably are made of molded or extruded elastomeric material, such as and preferably polyurethane.

Normally parallel and laterally spaced and usually upright or outwardly projecting relative to its base 14, the sides or wings 10 of each fastener 9 and its base, together bound the sides and bottom of a longitudinally coterminous cavity or pocket 15 in the fastener. Suitably generally rectangular in cross-section, the cavity 15 in each fastener 9 opens upwardly through a laterally concentric longitudinally coterminous relatively narrow or restricted entry slot 16. Bolted or otherwise suitably anchored to the frame 1, each fastener 9, for the illustrated incrementally apertured anchor or support member 5, conveniently has integral or rigid with or fixed or bonded to it, as correspondingly longitudinally spaced dependents or downward projections, a plurality of elastomeric, preferably polyurethane, frusto-conical anchoring pins 17. Axially bored or otherwise reduced in bulk for enhanced compressibility, the anchor pins 17 project through and have restricted necks 18 suitably tightly fitting the apertures 19 in the anchor member.

Elastomeric and flexible-sided, the sides 10 of each fastener 9 in effect are hinged or hingedly attached at the bottom to the fastener's base 14. Thus, so long as its cavity 15 is empty or unoccupied, either one or both of the fastener's sides 10 can yieldably deflect, flex, hinge, give or fold inwardly or toward each other. In that inwardly flexed condition of a fastener's side or sides 10, illustrated in the fragmentary vertical sectional view of FIG. 3, the edge of sides of either of both adjoining panels 8 are enabled readily to be engaged with or seated in and disengaged or unseated from the grooves or seats 11 in the sides 10 of the fastener 9. With the fasteners and not the panels anchored to the frame, installation and removal of a panel still requires the fasteners to be capable and readily of releasably locking a panel in place.

The above capability is derived from elastomeric, suitably polyurethane, T-shaped lock or key members 20, each topped by a longitudinally elongated flat strip 21, some of which strips, intermediate their ends, suitably have or are surmounted by upward protuberances, humps or sleeves 22 laterally or transversely slotted, apertured or through bored for slidably receiving and fastening end portions of dam sections or modules 23. Each lock member 20 has depending from its top strip 21 a downwardly bulged or enlarged upwardly necked stem or tongue 24. Depending on the lateral yieldability of the sides 10 of the fastener 9 in the area of the slot 16, the lock member's stem may itself be compressible for insertion through the slot and expandable in the cavity 15 or relatively or substantially hard or incompressible and dependent for insertion on lateral yieldability of the sides 10 of the fastener 9 in the area of the slot. In either case the lock member's enlarged step, once inserted, substantially fills or equals the normal volume of the cavity 15 in the fastener 9 and laterally forces, wedges or spreads the sides 10 to normal upright position, thereby locking sides of adjoining panels to the confronting sides of fastener and to the frame 1. Unlocking or releasing an individual panel 8 from a fastener 9 for repair or replacement is simply a matter of pulling or prying out of the fastener the stem or tongue 24 of any lock member involved in the locking and without disturbing the multi-pin or other anchoring of the fastener to the underlying anchor member 5.

In the illustrated exemplary screening apparatus in which the panels 8 are mounted three-abreast and four in tandem for a total of twelve, the side panels are half the width of the center panels and have their outer borders, sides or edgings 13 supported on ledges 25 bolted or otherwise fixed or attached to the insides of the side plates 2. With their inner borders or sides 13 releasably lockable to adjoining fasteners 9, the outer borders or sides of the side panels 8 are adapted to fit or be received in undercuts or recesses 26 in longitudinally elongated clamping blocks or vise jaws 27, each attached, as by bolting to and vertically adjustable on one of the side plates 2 above the ledge 25 thereon for clamping the border 13 of an adloining panel to the ledge. If, as suitable, the clamping blocks 27 are made of elastomeric or plastic material, they preferably are attached to the side plates 2 by carriage bolts 28 projected through retainer plates 29 embedded or recessed in the blocks and vertically elongated slots 30 in the side plates.

In addition to locking them in place, it often is desirable to support panels 8 midway of their sides. Two types of mid-supports are illustrated, one, the longitudinal rubber-capped angle iron bucker 7 of FIG. 5 and the other, the polyurethane bucker strip 31 of FIG. 2. Particularly suited as a mid-support for wider panels 8, such as the center panel of FIG. 2, the bucker strip 31 suitably is flat and longitudinally extending, has a longitudinally coextensive raised center boss or ridge 32, and, as are the fasteners 9, suitably is anchored to an underlying apertured anchor member 5 by integral or rigidly attached anchoring pins 17.

Longitudinally spaced relative to the panels 8, the dam sections 23 are stepped at the bottoms of their end portions for fitting of their inner ends in the suitably rectangularly cross-sectioned lateral apertures 33 in the humps 22 of the strips 21 serving as dam section retainers and now designated as 34 to distinguish them from the other locking strips. Held or fastened to the fasteners 9 to which the panel edges 12 are locked, the retainers 34 retain or anchor the inner ends of the dam sections or modules 23 and the same function is performed adjacent the side plates by slotting or recessing the clamping blocks 27 for receiving and clamping the outer ends of the dam sections to the ledges 25.

Ordinarily, profile wire screens 35 have longitudinal wedge-shaped screen wires backed by and welded to transverse tie rods and the tie rods are coextensive in length with the overall width of the screen. However, in the sustem of the present invention, the tie rods 36 of profile wire screen panels 8 are used to strengthen the panel and particularly its bond or connection to its generally rectangularly cross-sectioned polyurethane edgings or borders 13 by extending the rod ends substantially uniformly into holes or apertures 37 in the confronting sides 38 of the borders and making the holes longitudinally elongated or oval-shaped to compensate for manufacturing tolerances in the lateral spacing of the rods. The same result can be obtained with woven wire or polyurethane screen or solid panels by molding in or otherwise providing the panels with internal or external reinforcing rods and similarly extending the rods into the panel's borders.

From the above detailed description it will be apparent that there has been provided a system for mounting screen and other panels in vibrating and other screening apparatus in which the panels are not anchored to the frame of the apparatus and instead are releasably lockable at inner sides to flexible-sided fasteners and at outer sides, adjacent side plates of the apparatus, are releasably and adjustably clampable to the side plates.

It should be understood that the described and disclosed embodiment is merely exemplary of the invention and that all modifications are intended to be included that do not depart from the spirit of the invention and the scope of the appended claims.

Having now described my invention, I claim:

1. A panel securable in a vibratory screening apparatus wherein the vibratory screening apparatus includes a frame having fastener means mounted thereon with each of the fastener means having elongated, laterally spaced side walls which are resiliently flexible inwardly or toward each other and which are flexible outwardly or away from each other and which are flexible outwardly or away from each other by insertion of a lock means between the side walls, said panel comprising:
    a panel having sides bounded by elastomeric borders, said elastomeric borders having edges adapted to engage within and disengage from an adjoining flexible wall of the fastener means, said elastomeric edges being cooperatively shaped to seat in an external groove in the flexible side wall of the fastener means for releasably locking said panel edge in the flexible side wall of the fastener means upon insertion of the lock means between the side walls of the fastener means.

2. The panel of claim 1 wherein said edges of said panel have laterally outstanding ribs, said ribs being receivable in the external groove of the side wall of the fastener means.

3. The panel of claim 1 wherein said edges of said panel bound sides of screening.

4. The panel of claim 3 wherein said screening is a profile wire screen which is backed and reinforced by tie rods extending across said screen, said tie rods having ends embedded in said elastomeric borders.

5. A vibratory screening apparatus comprising:
    a frame having spaced side plates and spaced cross members extending between said spaced side plates;
    anchor members secured to said spaced cross members;
    fastener means mounted on said anchor members, said fastener means including laterally spaced side walls which are resiliently flexible inwardly or toward each other, said side walls having external grooves;

lock means insertable in said fastener means between said side walls to flex said side walls outwardly; and panels securable on said frame, said panels each having sides bounded by elastomeric borders, at least some of said elastomeric borders having edges adapted to engage with said external grooves of said side walls of said fastener means upon insertion of said lock means in said fastener means.

* * * * *